(12) United States Patent
Jones et al.

(10) Patent No.: US 7,963,585 B2
(45) Date of Patent: Jun. 21, 2011

(54) VEHICLE TONNEAU COVER SYSTEM

(75) Inventors: Peter Jones, Richmond (AU); David Alan Parsons, Melbourne (AU); Cindy Jane Tocci, Melbourne (AU)

(73) Assignee: Ford Motor Company of Australia Limited, Victoria (AU)

( * ) Notice: Subject to any disclaimer, the term of this patent is extended or adjusted under 35 U.S.C. 154(b) by 143 days.

(21) Appl. No.: 12/338,513

(22) Filed: Dec. 18, 2008

(65) Prior Publication Data

US 2010/0156137 A1 Jun. 24, 2010

(51) Int. Cl.
*B60P 7/04* (2006.01)

(52) U.S. Cl. .......... 296/136.03; 296/100.16; 296/100.18

(58) Field of Classification Search ............. 296/100.01, 296/100.11, 100.13, 100.15–100.18, 136.01, 296/136.03, 136.1; 410/96, 97, 100; 160/327, 160/328, 368.1
See application file for complete search history.

(56) References Cited

U.S. PATENT DOCUMENTS

| | | | | |
|---|---|---|---|---|
| 4,923,240 A * | 5/1990 | Swanson | ................. | 296/100.18 |
| 4,936,724 A | 6/1990 | Dutton | | |
| 5,050,924 A * | 9/1991 | Hansen | ..................... | 296/100.15 |
| 5,137,324 A * | 8/1992 | Hershberger | ............ | 296/100.16 |
| 5,152,574 A | 10/1992 | Tucker | | |
| 5,251,951 A | 10/1993 | Wheatley | | |
| 5,324,091 A * | 6/1994 | Baker | ...................... | 296/100.18 |
| 5,365,994 A * | 11/1994 | Wheatley et al. | ............. | 160/354 |
| 5,431,474 A * | 7/1995 | Burkey | ..................... | 296/100.15 |
| 5,553,652 A * | 9/1996 | Rushford | ...................... | 160/354 |
| 5,887,934 A | 3/1999 | Smith | | |
| 5,984,400 A | 11/1999 | Miller et al. | | |
| 6,053,558 A | 4/2000 | Weldy et al. | | |
| 6,257,306 B1 * | 7/2001 | Weldy | .......................... | 160/327 |
| 6,386,616 B1 | 5/2002 | Wheatley | | |
| 6,669,264 B1 | 12/2003 | Tucker | | |
| 6,783,312 B2 * | 8/2004 | Smith | ............................. | 410/97 |
| 7,229,121 B2 * | 6/2007 | Fox et al. | ................. | 296/100.16 |
| 2005/0057069 A1 * | 3/2005 | McNamara | .............. | 296/100.16 |

* cited by examiner

*Primary Examiner* — Glenn Dayoan
*Assistant Examiner* — Gregory Blankenship
(74) *Attorney, Agent, or Firm* — Gregory P. Brown; Price, Henevel, Cooper, Dewitt & Litton, LLP

(57) ABSTRACT

A tonneau system for a vehicle bed includes a rail disposed on a top portion of the vehicle bed. A tonneau cover extends over the vehicle bed and includes an elongate retention clip is adjacent the rail and is connected thereto by an interference fit. The elongate retention clip includes a removal tab. A connection clip is slidable along the linear extent of the rail. An elongate band is slidably received in the tonneau cover and in a band aperture of the connection clip.

18 Claims, 6 Drawing Sheets

US 7,963,585 B2

VEHICLE TONNEAU COVER SYSTEM

FIELD OF THE INVENTION

The present invention relates to tonneau covers, and more specifically, to a flexible tonneau cover system with a flexible load coverage capability.

BACKGROUND OF THE PRESENT INVENTION

Tonneau covers cover the bed of a vehicle, protecting cargo from weather and from possible loss during travel.

SUMMARY OF THE INVENTION

In one aspect of the present invention, a tonneau system for a vehicle bed includes a rail disposed on a top portion of the vehicle bed. A tonneau cover extends over the vehicle bed and includes an elongate retention clip that is adjacent the rail and is connected thereto by an interference fit. The elongate retention clip includes a removal tab. A connection clip is slidable along the linear extent of the rail. An elongate band is slidably received in the tonneau cover and in a band aperture of the connection clip.

In another aspect of the present invention, a tonneau system includes a rail and a tonneau cover having an elongate retention clip with a removal tab and an interference fit connection with the rail. At least one connection clip is slidable along the rail and an elongate band is slidably received in the tonneau cover and slidably received through the connection clip.

In yet another aspect of the present invention, a method of attaching a tonneau cover to a vehicle bed includes providing a rail on a vehicle bed. A tonneau cover is provided with an elongate retention clip. An elongate band is slidably connected with the tonneau cover. The elongate retention clip is removably connected with the rail. A removal tab extends from the elongate retention clip. Connection clips are slidably attached with a portion of the rail and the elongate band extends through a band aperture on the connection clip.

These and other features, advantages, and objects of the present invention will be further understood and appreciated by those skilled in the art upon studying the following specification, claims, and appended drawings.

DETAILED DESCRIPTION OF EMBODIMENTS

Figure 1:
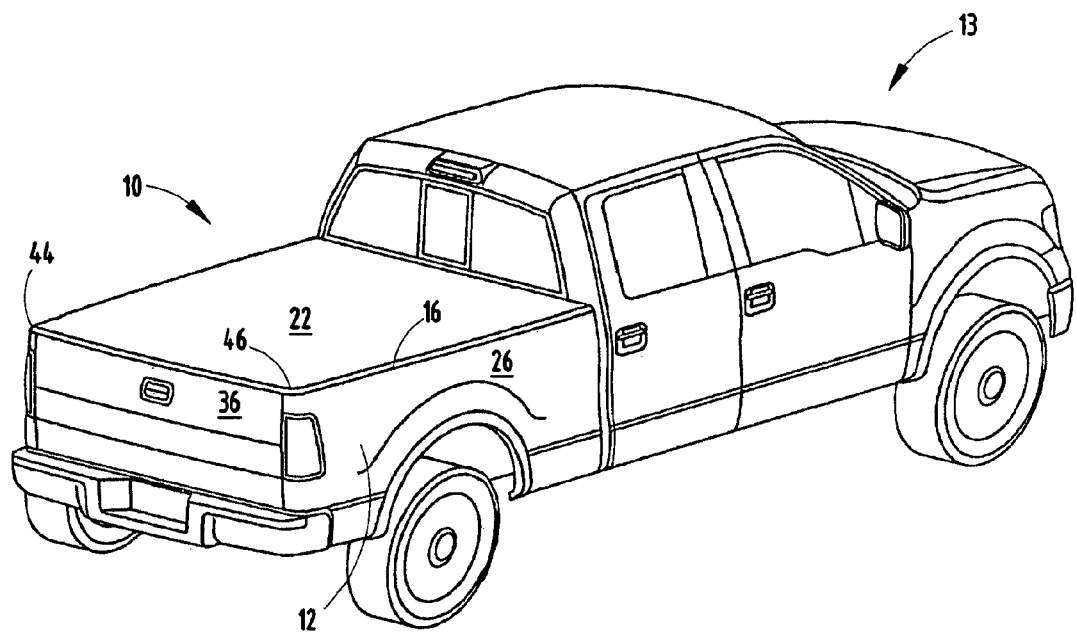
FIG. 1 is a top perspective view of a vehicle incorporating one embodiment of a tonneau cover system of the present invention.

For purposes of description herein the terms "upper," "lower," "right," "left," "rear," "front," "vertical," "horizontal" and derivatives thereof shall relate generally to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-3B, the illustrated embodiment includes reference numeral 10 which generally designates a tonneau system for a vehicle bed 12 of a vehicle 13 that includes a rail 14 disposed on a top portion 16 of the vehicle bed 12. A tonneau cover 22 extends over the vehicle bed 12 and includes an elongate retention clip 18 that is adjacent the rail 14 and is connected thereto by an interference fit. The elongate retention clip 18 includes a removal tab 20. A connection clip 28 is slidable along the linear extent of the rail 14. An elongate band 30 is slidably received in the tonneau cover 22 and in a band aperture 32 of the connection clip 28.

Figure 2:
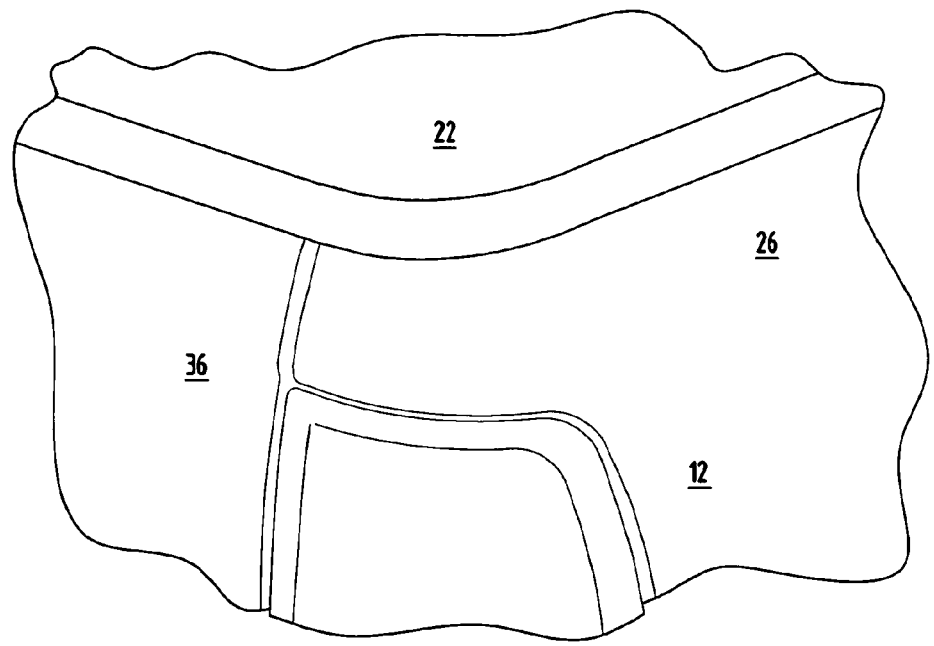
FIG. 2 is a partial top perspective view of a rear corner of the vehicle of FIG. 1 with the tonneau cover system.

FIG. 2 illustrates one embodiment of the tonneau system 10 with the tonneau cover 22 extending over the vehicle bed 12 and providing a flush fit aesthetic appearance. The rail 14 and elongate retention clip 18 are provided on a tailgate 36 of the vehicle 13 as well as both side panels 26. Accordingly, the tonneau cover 22 has a flush fit with both the tailgate 36 of the vehicle bed 12 as well as external side panels 26 of the vehicle bed 12.

Figure 3A:
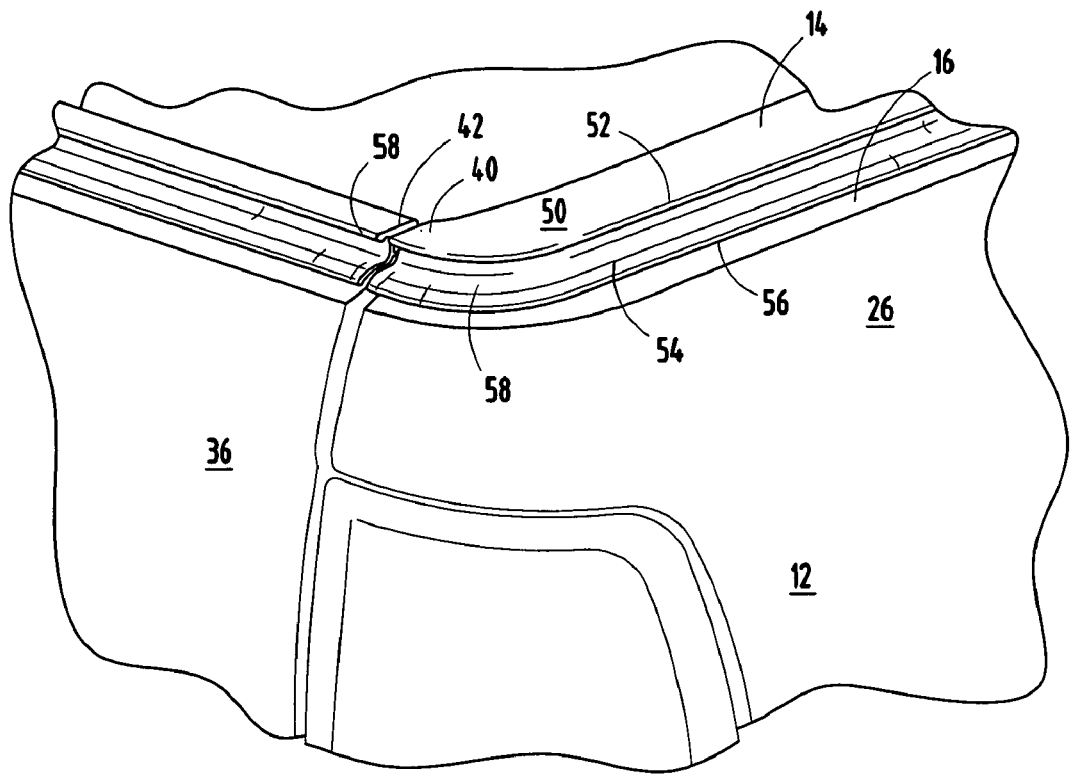
FIG. 3A is a partial top perspective view of a rear corner of a vehicle with a rail.
Figure 3B:
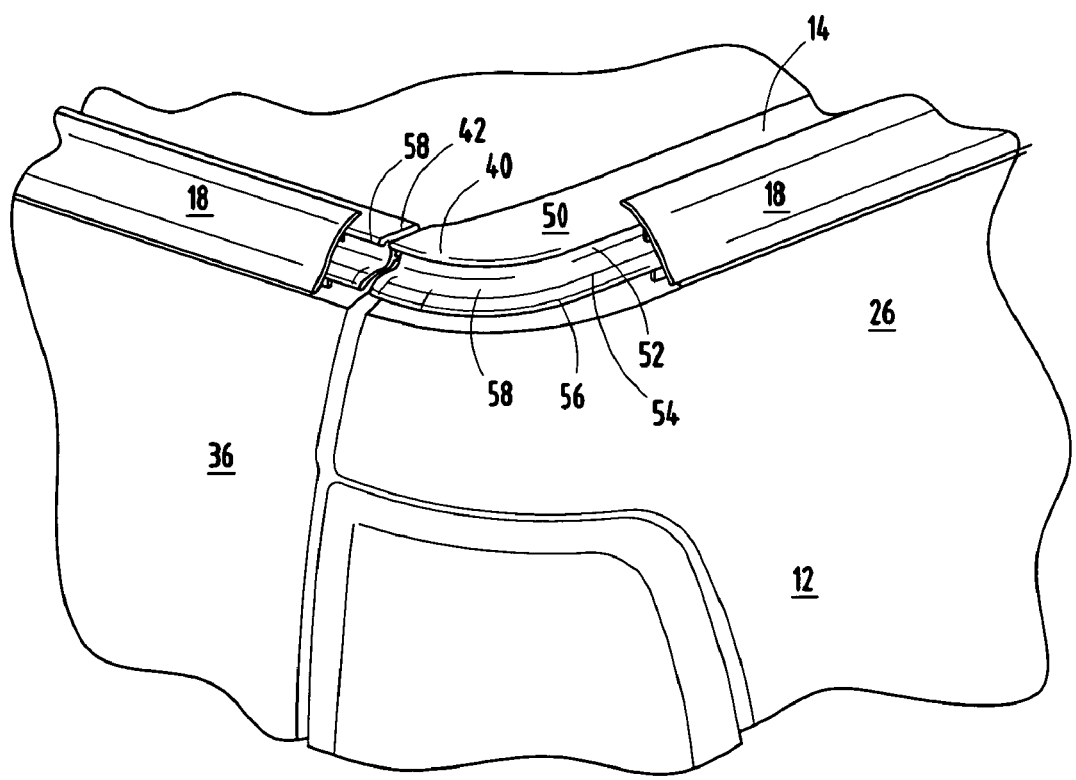
FIG. 3B is a partial top perspective view of a rear corner of a vehicle including an elongate retention clip.

Referring to FIGS. 3A and 3B, the rail 14 extends longitudinally over the top portion 16 of the vehicle bed 12. The rail 14 includes an arcuate corner 40 and a split 42 between the rail 14 at the junction of the side panel 26 of the vehicle bed 12 and the tailgate 36 of the vehicle bed 12. The split 42 is located at both the rear left corner 44 and rear right corner 46 (FIG. 1) of the vehicle bed 12. The rail 14 includes a relatively planar top portion 50 that terminates at a bulbous flange 52. A bottom portion 54 of the rail 14 includes an retention tab 56 designed to interface with the elongate retention clip 18 as disclosed in further detail below. A slot 58 extends longitudinally along the linear extent of the rail 14 between the bulbous flange 52 and the retention tab 56. The elongate retention clip 18 includes an abutment flange 60 that abuts bulbous flange 52 on the top portion 16 of the rail 14. The elongate retention clip 18 also includes a retention hook 62 adapted to receive the retention tab 56 on the bottom portion 54 of the rail 14.

Figure 4:
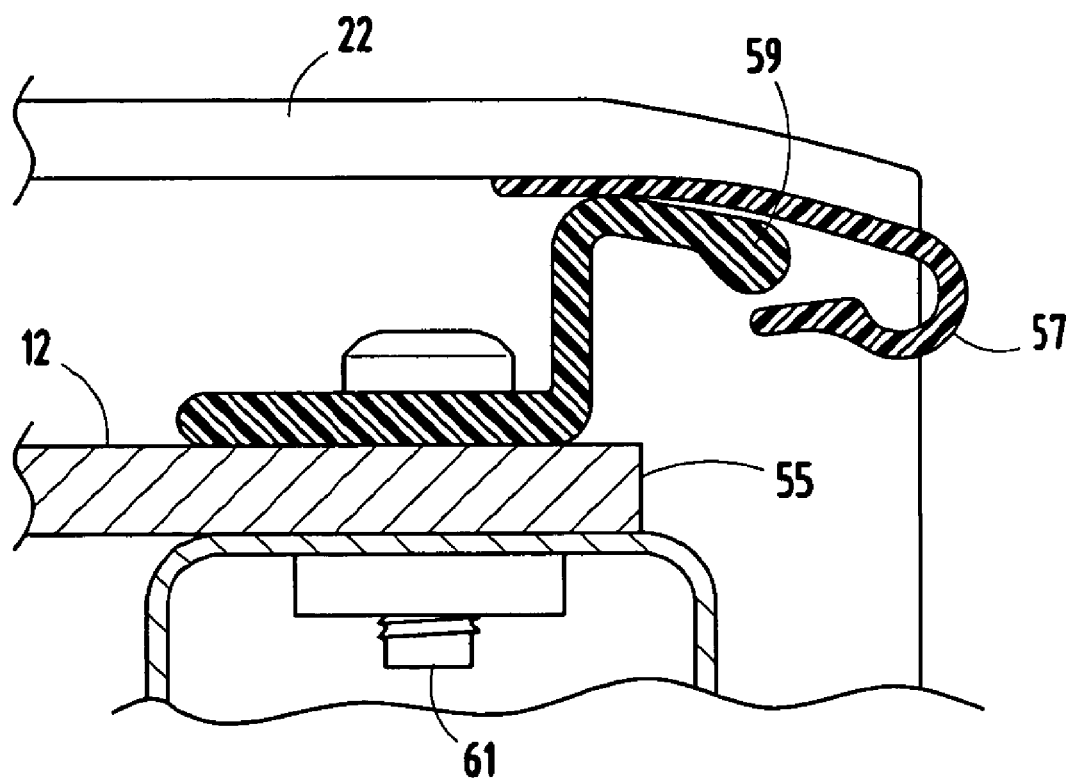
FIG. 4 is a side cross-sectional view of a forward portion of the vehicle bed prior to connection with the tonneau cover system.

Referring to FIG. 4, the tonneau cover 22 is designed to removably connect with a forward portion 55 (FIG. 1) of the vehicle bed 12. The tonneau cover 22 includes a receiving hook 57 adapted to receive and retain a forward flange 59 connected to the forward portion 55 of the vehicle bed 12 by mechanical fasteners 61. Alternatively, the forward flange 59 could be attached by welding or by another form of mechanical connection as known by those having ordinary skill in the art. After the forward portion 55 of the vehicle bed 12 has been connected with the receiving hook 57, the elongate retention clip 18 of the tonneau cover 22 can be connected with the rail 14.

Figure 5A:
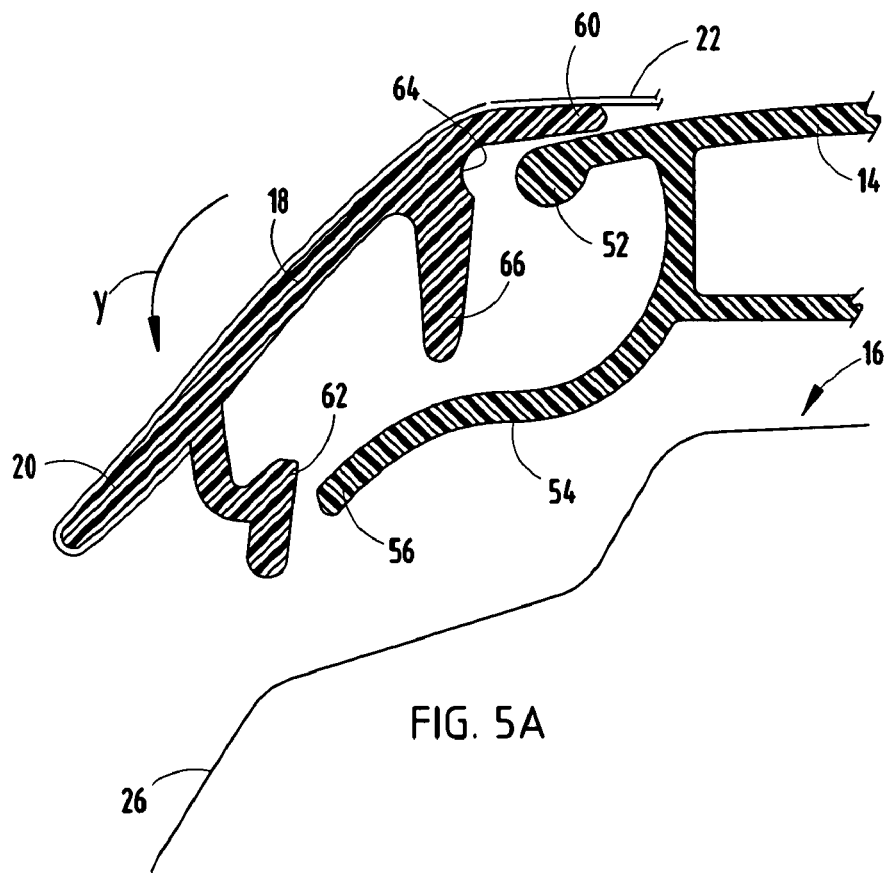
FIG. 5A is an enlarged cross-sectional elevational view of the elongate retention clip prior to connection with the rail.
Figure 5B:
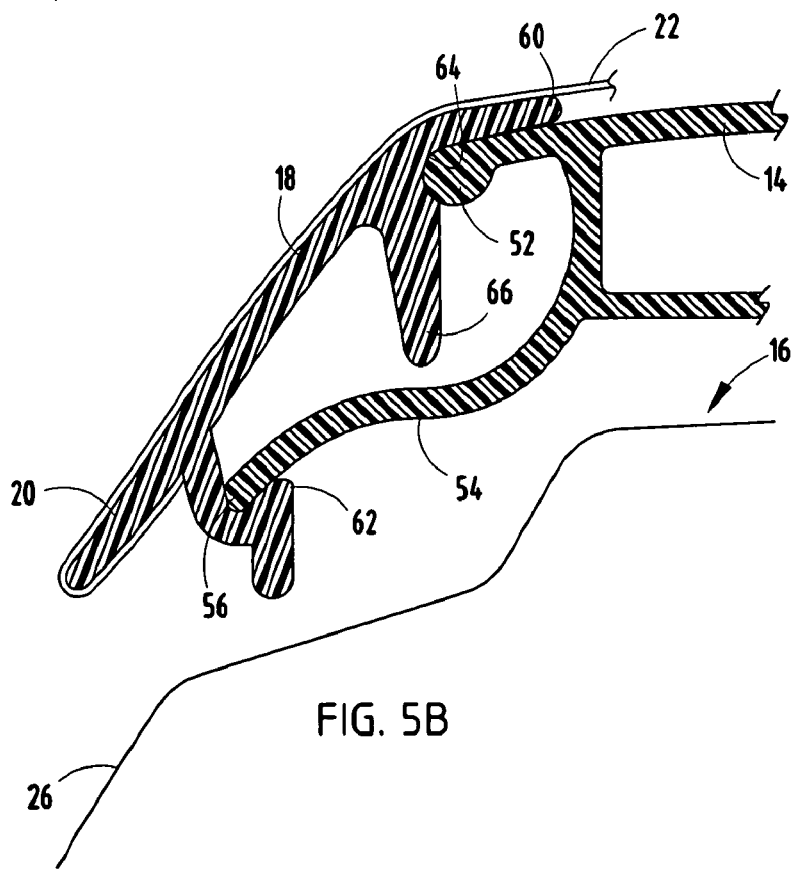
FIG. 5B is an enlarged cross-sectional elevational view of the elongate retention clip after connection with the rail.
Figure 6:
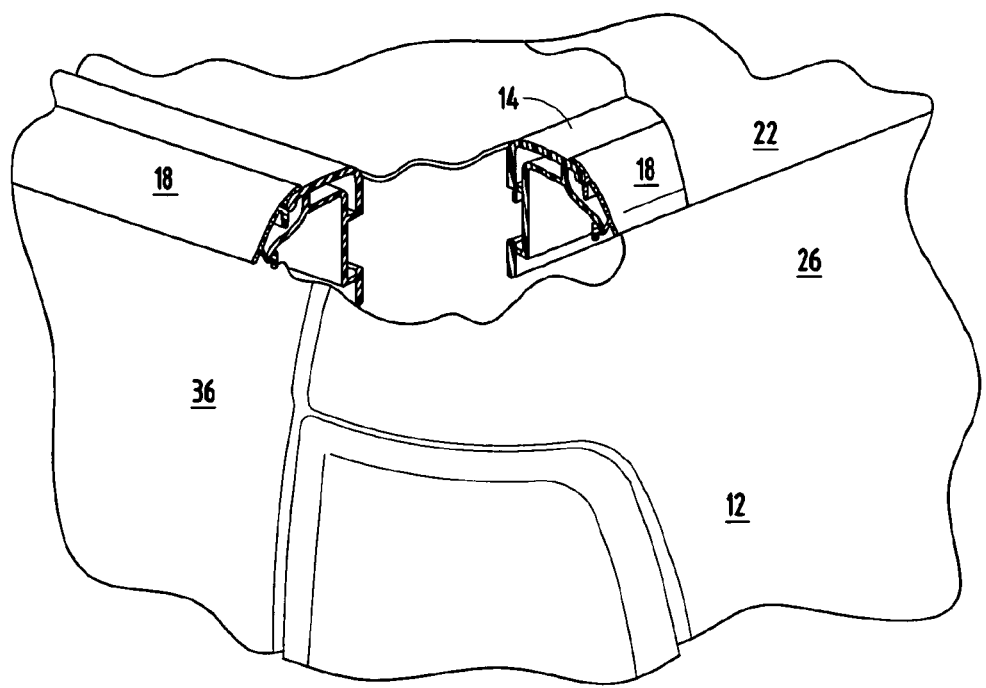
FIG. 6 is a partial top perspective view of the rear corner of FIG. 2, with a portion of the rail, elongate retention clip, and tonneau cover removed.

Referring now to FIGS. 5A, 5B, and 6, when the tonneau cover 22 is fitted over the vehicle bed 12 to create a flush appearance, a pivot area 64 defined between a tensioner 66 on the elongate retention clip 18 and the abutment flange 60 is secured against the bulbous flange 52. The elongate retention clip 18 is then rotated downward in the direction of arrow Y about the bulbous flange 52 of the rail 14. The retention hook 62 on the elongate retention clip 18 engages the retention tab 56 on the bottom portion 54 of the rail 14 until the retention tab 56 is received in the retention hook 62 thereby providing a secure connection of the elongate retention clip 18 and tonneau cover 22 to the rail 14 which is consequently connected with the vehicle bed 12.

Figure 7:
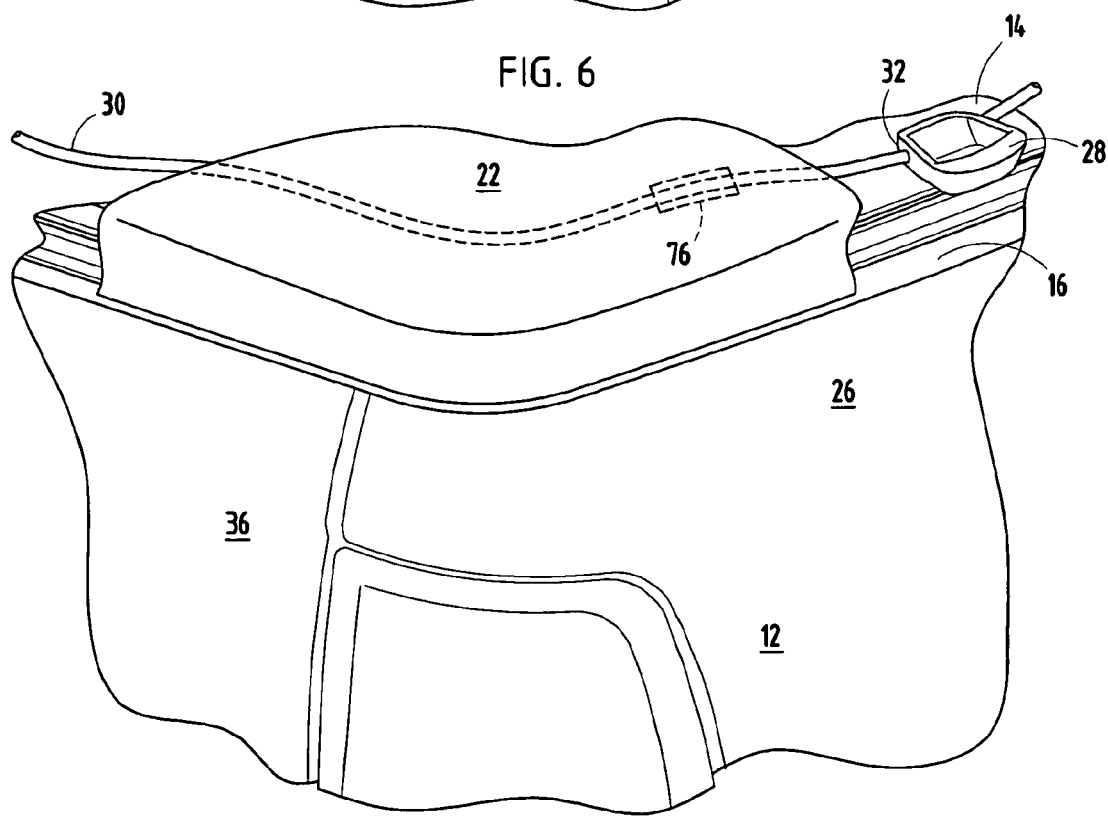
FIG. 7 is a top perspective view of a rear corner of a vehicle including connection clips.
Figure 8:
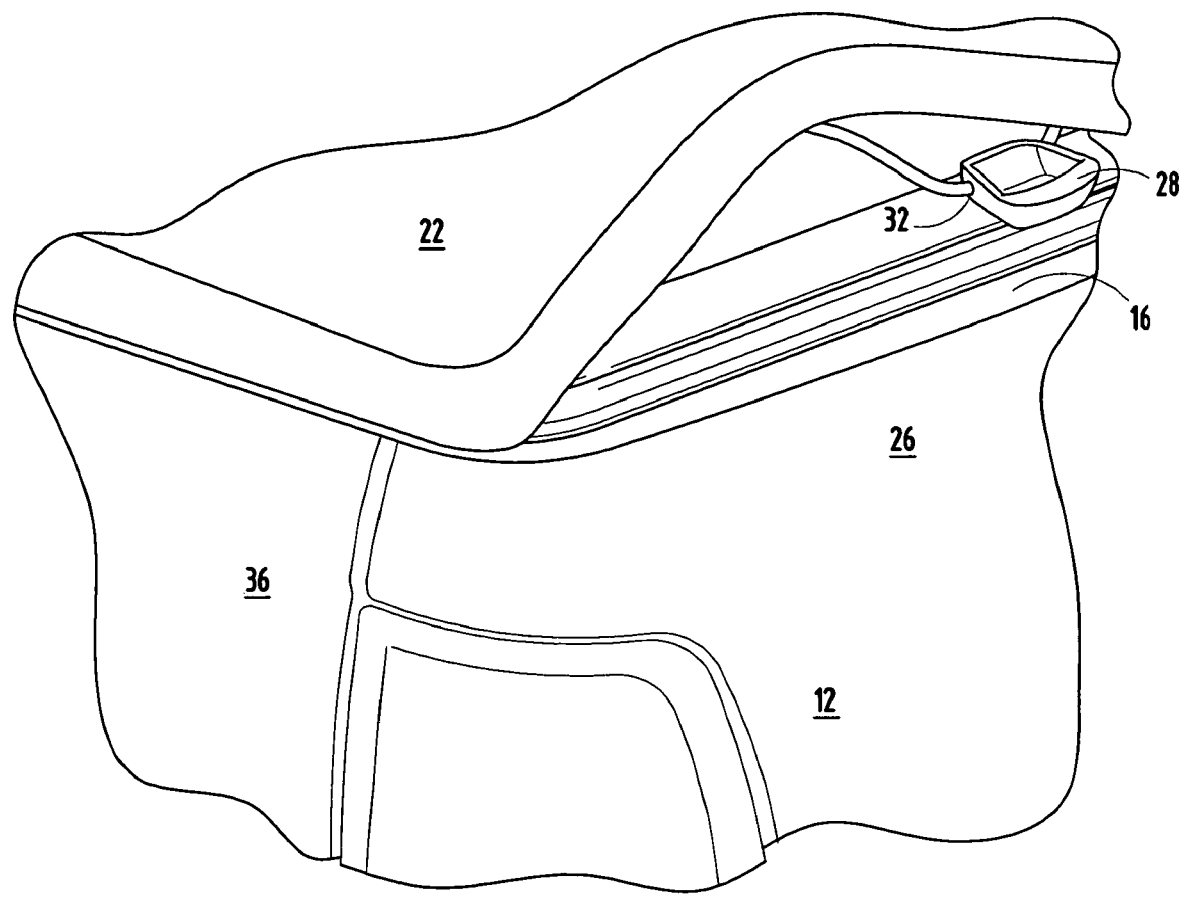
FIG. 8 is a partial top perspective view of one embodiment of a tonneau cover system of the present invention with bulky cargo.
Figure 9:
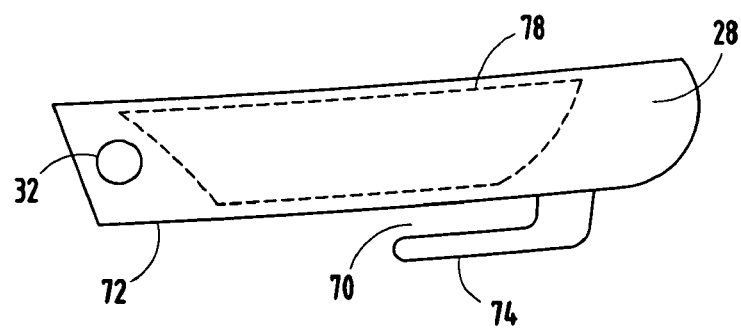
FIG. 9 is an enlarged side elevational view of a connection clip.

Referring now to FIGS. 7 and 8, which illustrate another embodiment of the present invention, the tonneau cover system 10 utilizes the connection clips 28 that slidably engage the rail 14. The connection clips 28 include an engagement slot 70 that is defined between a bottom portion 72 of the connection clip 28 and an engagement finger 74 that extends below the bottom portion 72 of the connection clip 28. The engagement slot 70 receives at least a portion of the bulbous flange 52 on the rail 14. The connection clip 28 is slidable along the linear extent of the rail 14 and the elongate band 30 is slidably received in the band apertures 32. The elongate band 30 is also slidably received in sleeves 76 on an underside of the tonneau cover 22. A handle portion 78 allows for easy relocation of the connection clip 28 along the rail 14. Accordingly, when bulky loads that would otherwise prohibit connection of a standard tonneau system need to be transported, the connection clips 28 provide a manner of transporting those bulky loads while allowing the tonneau cover 22 to maintain its connection with the vehicle bed 12 by way of the connection clips 28 and elongate band 30.

It is contemplated that the elongate band 30 may include an elastic portion and an inelastic portion. In one embodiment, the inelastic portion is larger than the elastic portion. In another embodiment, the inelastic portion is about seventy percent of the elongate band 30 and the elastic portion is about thirty percent of the elongate band 30.

The above description is considered that of the illustrated embodiments only. Modifications of the invention will occur to those skilled in the art and to those who make or use the invention. Therefore, it is understood that the embodiments showing the drawings and described above are merely for illustrative purposes and not intended to limit the scope of the invention, which is defined by the following claims as interpreted according to the principles of patent law, including the Doctrine of Equivalents.

We claim:

1. A tonneau system for a vehicle bed, comprising:
    a rail having upper and lower flanges;
    a tonneau cover operably connected to the vehicle bed by an elongate retention clip that abuts the upper flange and wraps below the lower flange;
    a connection clip engaged with and slidable along the upper flange of the rail; and
    an elongate band slidably received in the tonneau cover and an aperture of the connection clip.

2. The tonneau system of claim 1, wherein:
    the connection clip includes an engagement slot defined between a bottom portion of the connection clip and an engagement finger, wherein the engagement slot receives a portion of the rail.

3. The tonneau system of claim 1, wherein:
    the elongate retention clip includes an abutment flange that abuts a top portion of the rail and a retention hook that receives a bottom portion of the rail.

4. The tonneau system of claim 3, wherein:
    the elongate retention clip includes a tensioner extending from the elongate retention clip, and an arcuate pivot area disposed between the tensioner and the top flange.

5. The tonneau system of claim 1, wherein:
    the upper flange includes a bulbous end.

6. The tonneau system of claim 1, wherein:
    an underside of the tonneau cover includes a plurality of sleeves slidably engaged with the elongate band.

7. A tonneau system comprising:
    a rail;
    a tonneau cover having an elongate retention clip that secures the tonneau cover with the rail;
    at least one connection clip engaged with and slidable along the rail; and
    an elongate band slidably received in a portion of the tonneau cover and slidably received through the connection clip.

8. The tonneau system of claim 7, wherein:
    the connection clip includes an engagement finger that extends from a lower portion of the connection clip.

9. The tonneau system of claim 7, wherein:
    the elongate retention clip includes an abutment flange that abuts the top portion of the rail and a retention hook that receives a bottom portion of the rail, thereby providing an interference fit engagement of the elongate retention clip with the rail.

10. The tonneau system of claim 9, wherein:
    the elongate retention clip includes a tensioner extending from the elongate retention clip, and an arcuate pivot area disposed between the tensioner and the abutment flange.

11. The tonneau system of claim 7, wherein:
    an underside of the tonneau cover includes a plurality of sleeves slidably engaged with the elongate band.

12. A method of attaching a tonneau cover to a vehicle bed, the method comprising:
    providing a rail with an upper flange and a lower flange on a vehicle bed;
    providing a tonneau cover with an elongate retention clip;
    slidably connecting an elongate band with the tonneau cover;
    removably connecting the elongate retention clip with the upper flange and the lower flange of the rail;
    slidably attaching a connection clip directly with the rail; and
    extending the elongate band through the connection clip.

13. The method of claim 12, the method further comprising:
    forming an engagement finger on the underside of the connection clip.

14. The method of claim 12, wherein the step of slidably connecting an elongate band with a tonneau cover further comprises:
    forming sleeves on an underside of the tonneau cover that are slidably engaged with the elongate band.

15. The method of claim 12, further comprising:
    extending an abutment flange from a portion of the elongate retention clip.

16. The method of claim 15, further comprising:
extending a tensioner from a portion of the elongate retention clip and forming a pivot area between the abutment flange and the tensioner.

17. The method of claim 12, further comprising:
forming a retention hook on the elongate retention clip that has an interference connection with the rail.

18. The method of claim 12, further comprising:

forming an abutment flange on the elongate retention clip that abuts the top portion of the rail.

* * * * *